No. 800,123. PATENTED SEPT. 19, 1905.
C. H. AYARS.
CAN SOLDERING MACHINE.
APPLICATION FILED AUG. 10, 1903.

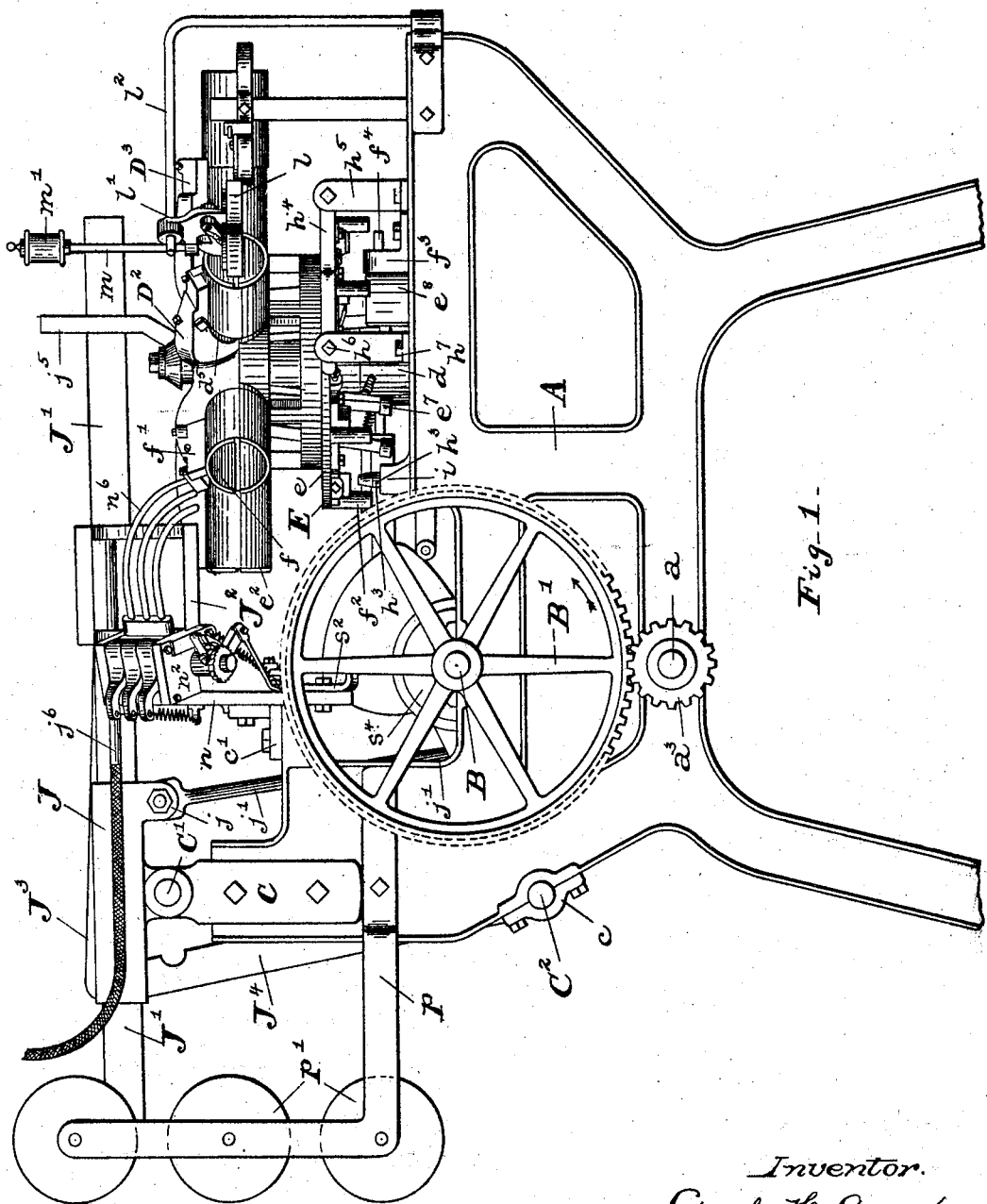

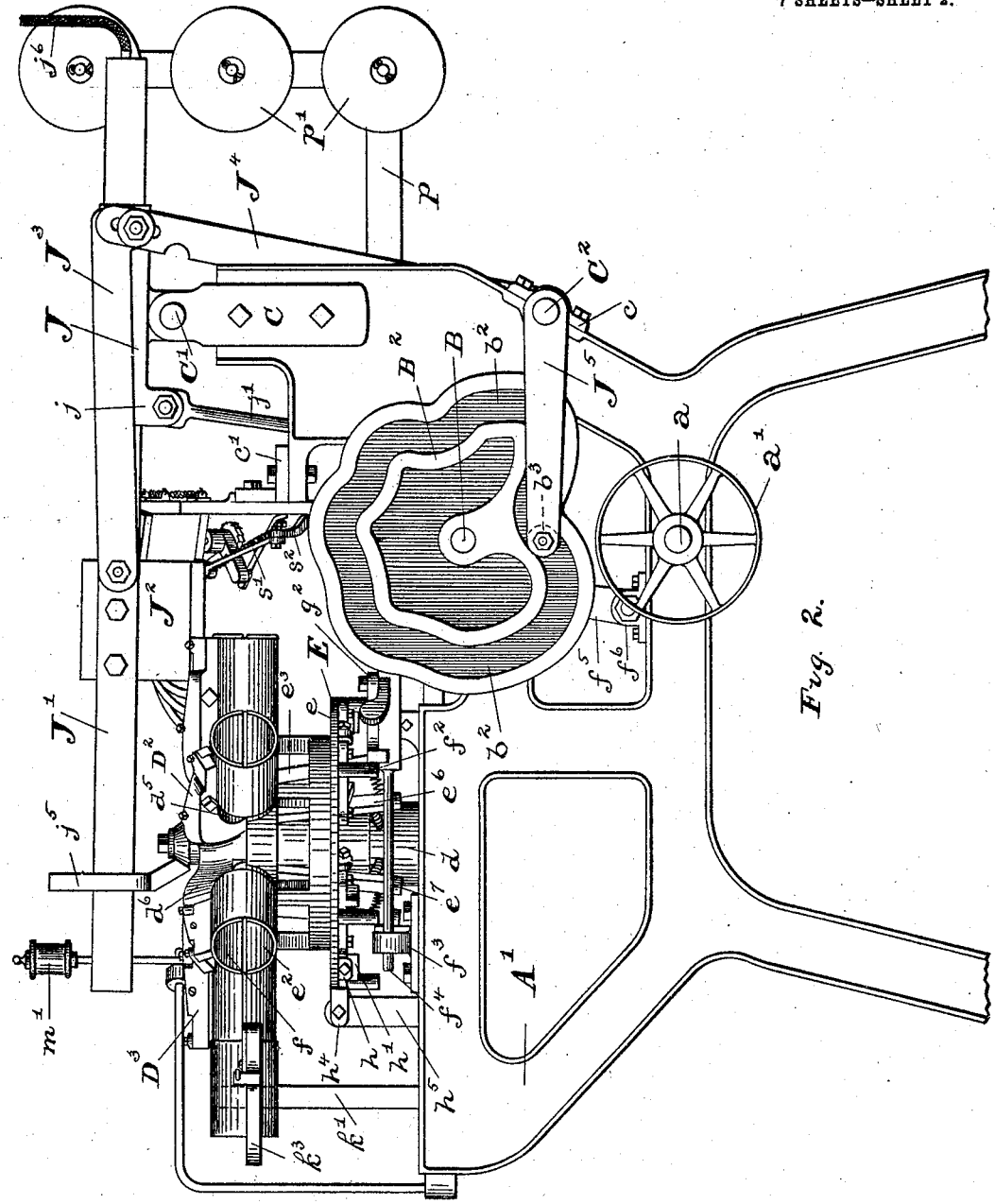

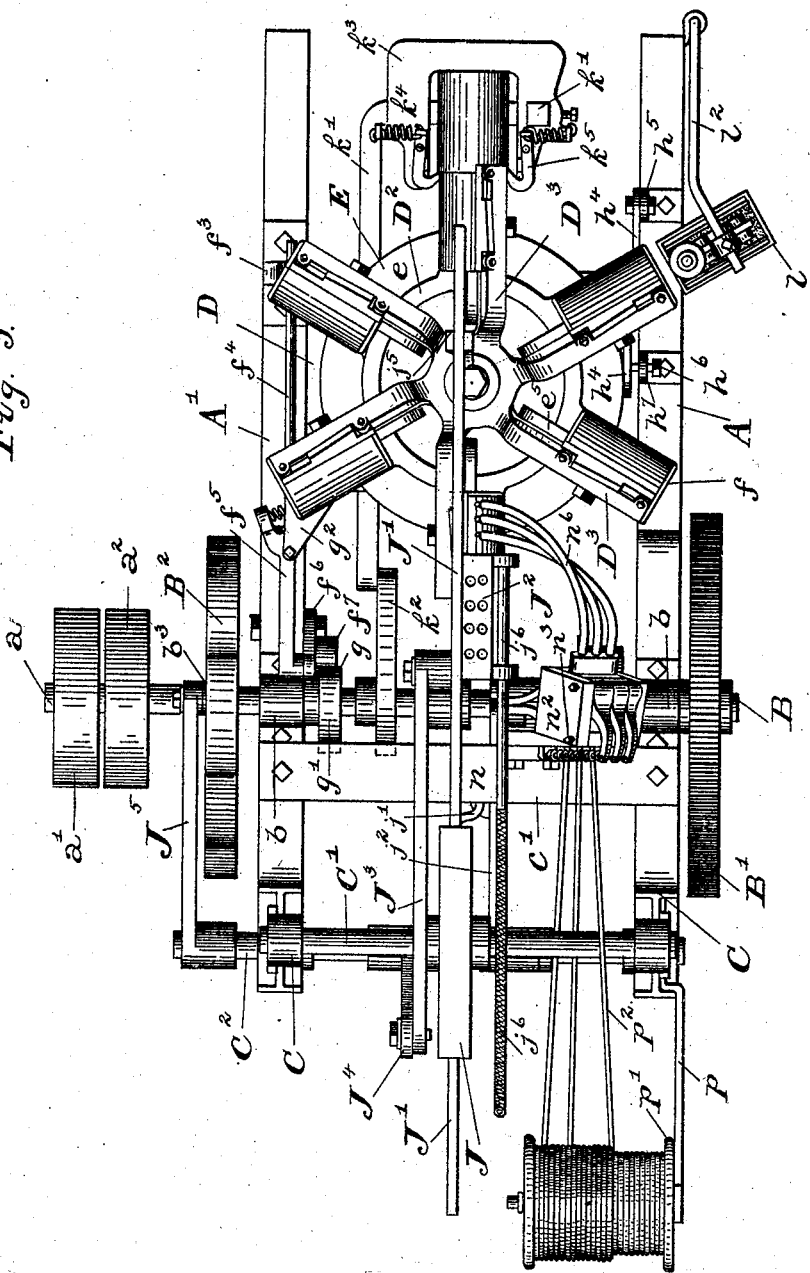

7 SHEETS—SHEET 4.

Witnesses.
H. F. Meyer, Jr.
G. F. Vogt.

Inventor.
Charles H. Ayars
By Mann & Co
Attorneys

No. 800,123. PATENTED SEPT. 19, 1905.
C. H. AYARS.
CAN SOLDERING MACHINE.
APPLICATION FILED AUG. 10, 1903.
7 SHEETS—SHEET 5.
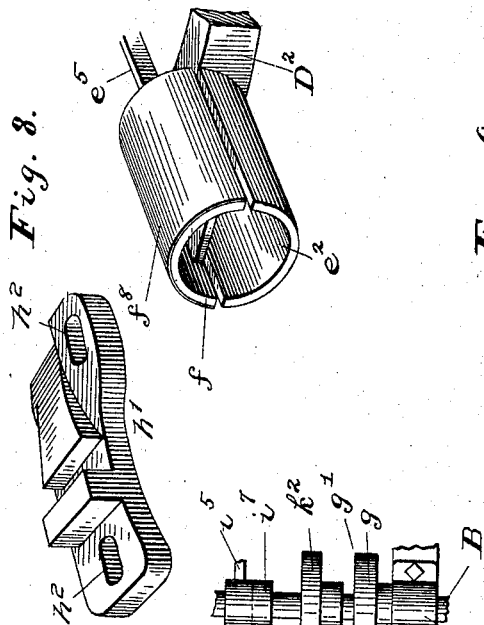
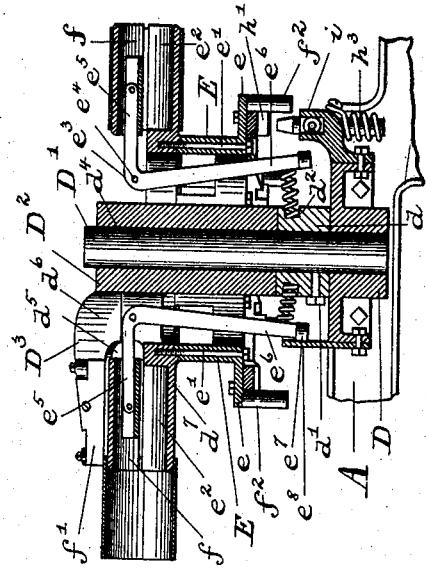
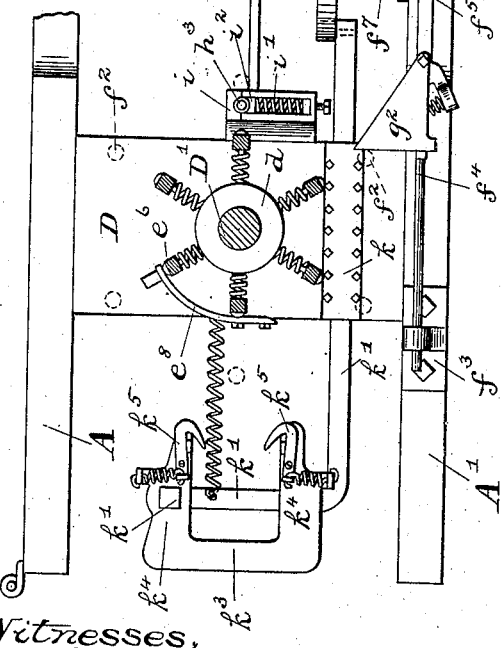
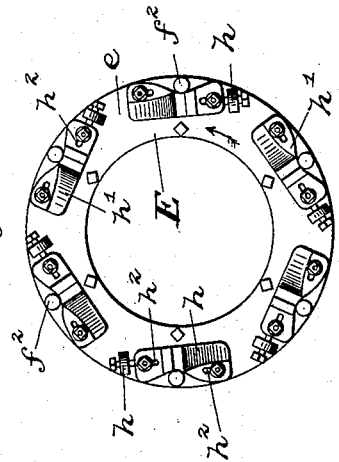
Witnesses
H. F. Meyer Jr.
G. F. Vogt
Inventor.
Charles H. Ayars
By Mann & Co,
Attorneys.

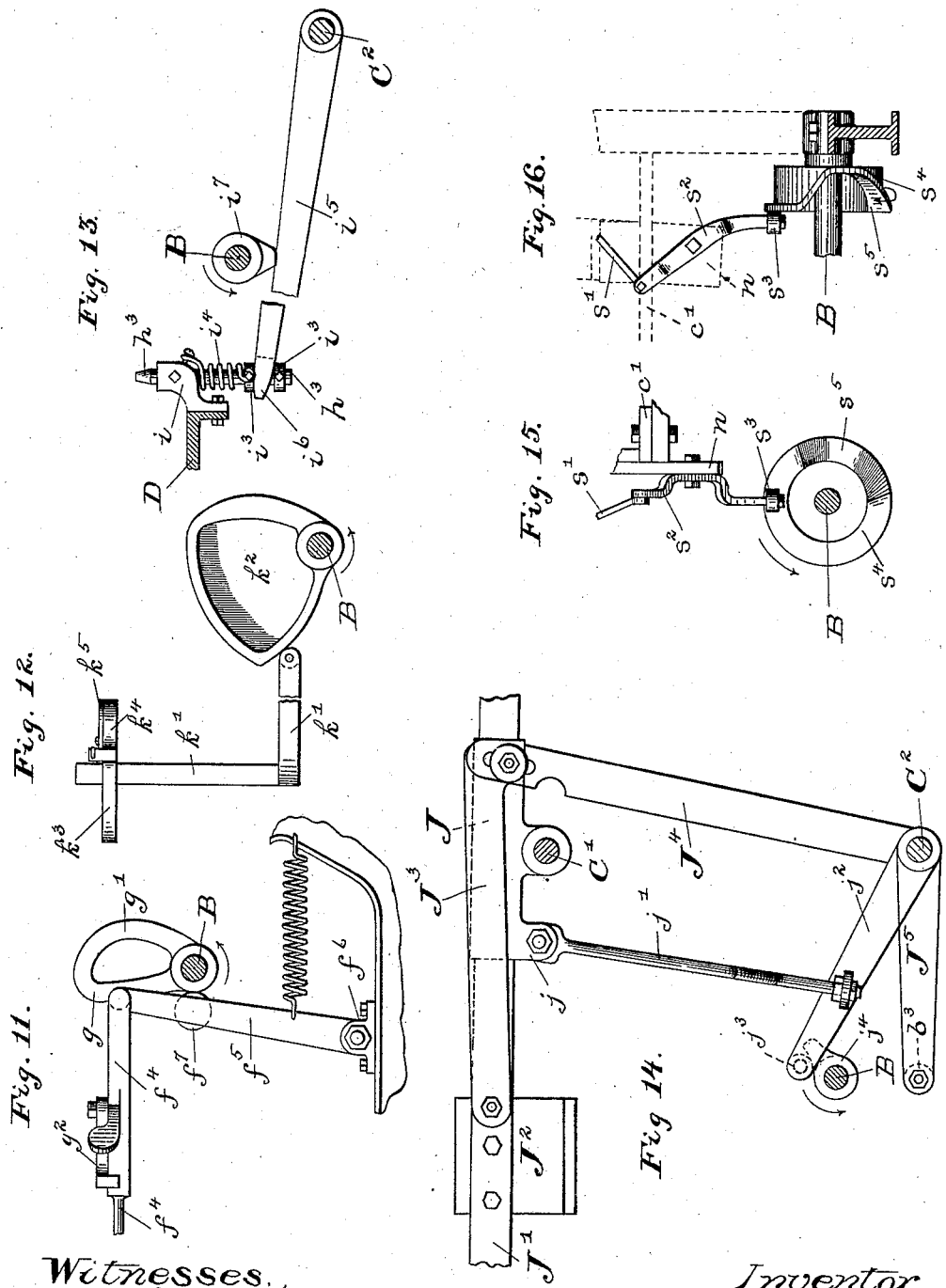

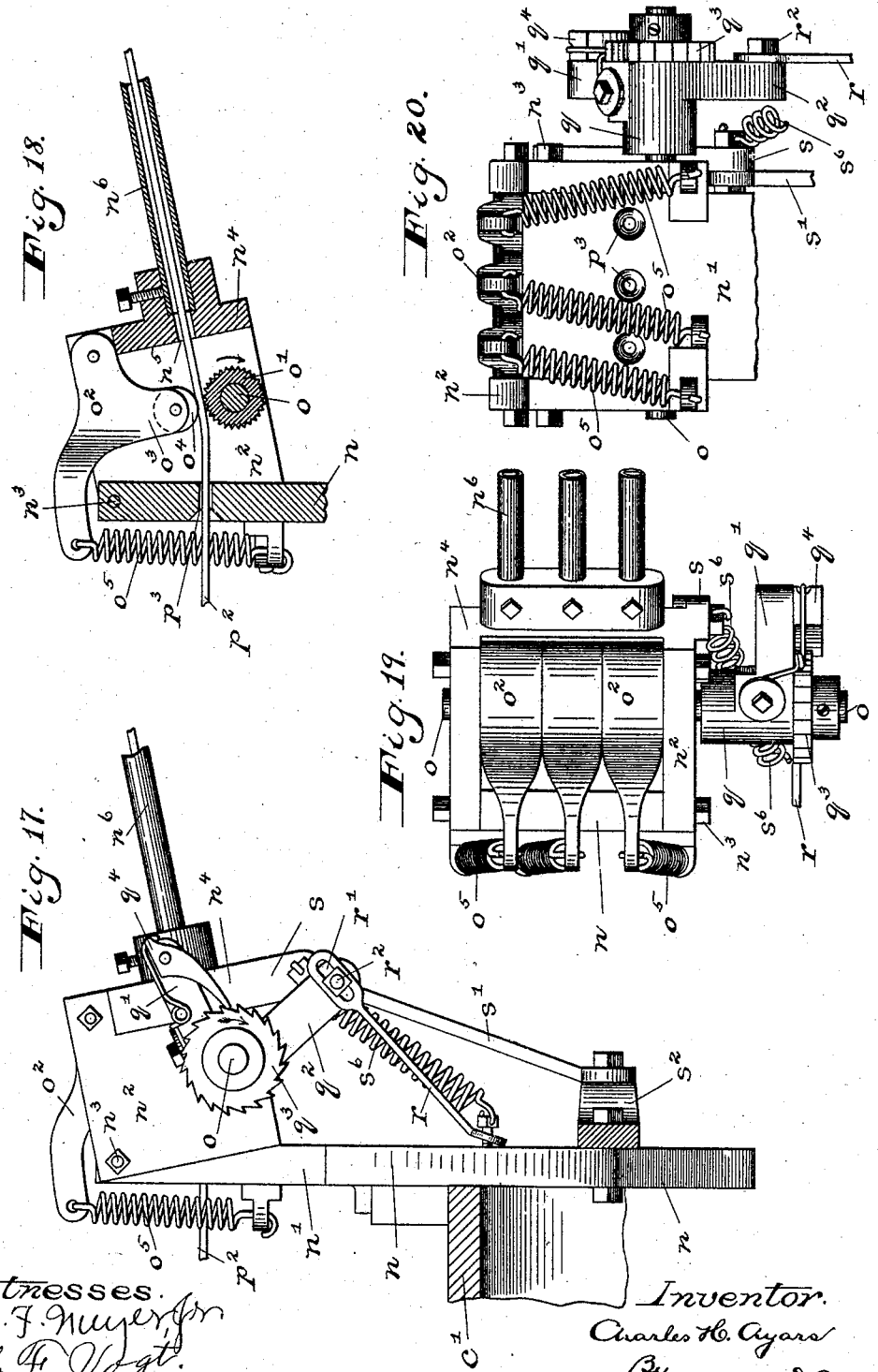

UNITED STATES PATENT OFFICE.

CHARLES H. AYARS, OF SALEM, NEW JERSEY, ASSIGNOR TO AYARS MACHINE COMPANY, OF SALEM, NEW JERSEY, A CORPORATION OF NEW JERSEY.

CAN-SOLDERING MACHINE.

No. 800,123. Specification of Letters Patent. Patented Sept. 19, 1905.

Application filed August 10, 1903. Serial No. 168,972.

*To all whom it may concern:*

Be it known that I, CHARLES H. AYARS, a citizen of the United States, residing at Salem, in the county of Salem and State of New Jersey, have invented certain new and useful Improvements in Can-Soldering Machines, of which the following is a specification.

This invention relates to improvements in machines for soldering the side seams of sheet-metal bodies.

One object of the invention is to provide an improved organization of machine whereby the several operations will be performed in a simple and reliable manner.

Another object of the invention is to provide an improved fluxing device whereby the bodies will be properly and readily fluxed as the blanks are placed on the mandrels.

Another object of the invention is to provide an improved mechanism for intermittently revolving and stopping the mandrels in order that the successive operations may be performed.

Another object of the invention is to provide improved solder-feed and soldering-iron devices, the several parts being arranged and combined, as hereinafter more fully described, and pointed out in the claims, reference being had to the accompanying drawings, in which—

Figure 9:
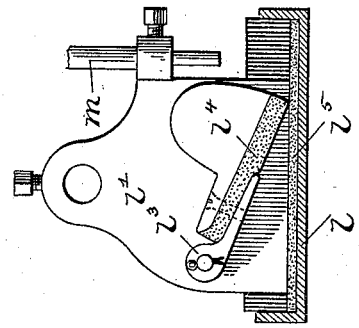
Figure 10:
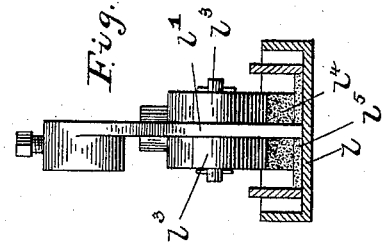
Figure 4:
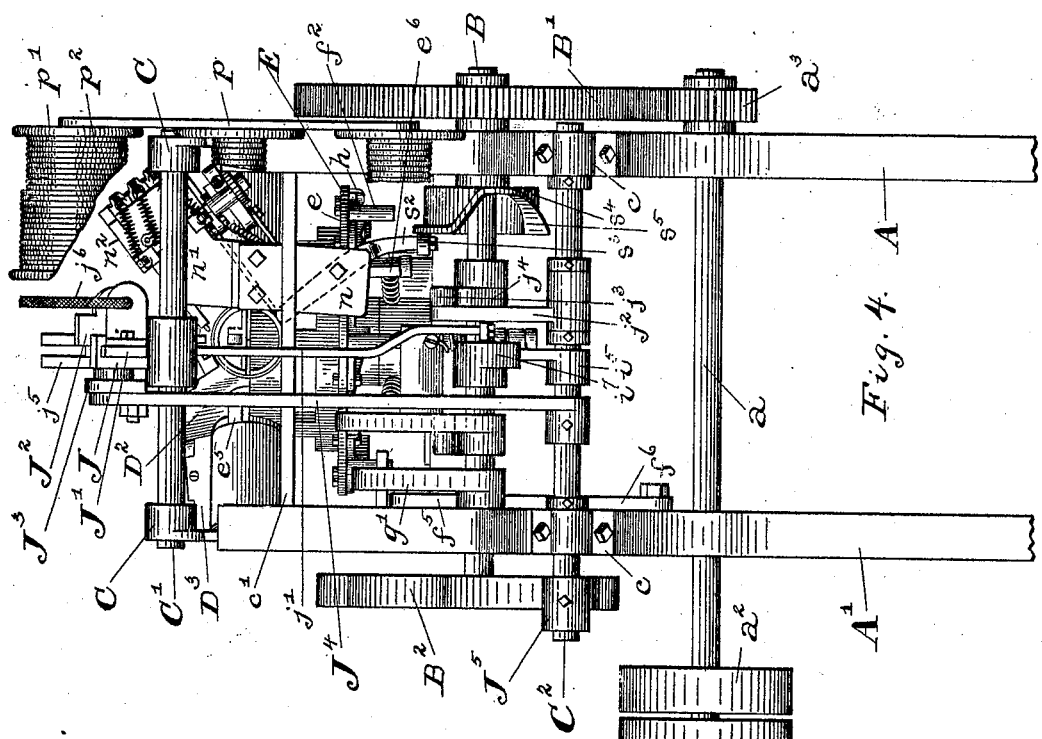

Figure 1 illustrates an elevation of one side of a machine constructed in accordance with my invention. Fig. 2 illustrates an elevation of the opposite side of said machine. Fig. 3 is a top plan view of same; Fig. 4, a rear elevation of same; Fig. 5, a detail plan view of the ejector mechanism; Fig. 6, a vertical sectional view of the mandrel mechanism; Fig. 7, an inverted plan view of the ring-plate of the mandrel mechanism. Fig. 8 is a detail of the movable enameled mandrel-section. Figs. 9 and 10 are enlarged detail views of the fluxing device. Fig. 11 is a diagrammatic view of the cam-and-lever mechanism for intermittently moving the mandrels. Fig. 12 is a similar view of the ejector mechanism; Fig. 13, a like view of the stop-pin device for stopping the rotation of the mandrels; Fig. 14, a similar view of the mechanism for reciprocating and rocking the soldering-iron bar; Figs. 15 and 16, diagrammatic views of the cam-and-lever mechanism for operating the solder-feed device; Figs. 17, 18, 19, and 20, detail views of the solder-feed mechanism. Fig. 21 is a perspective view of one of the stop-plates on the bottom of the ring-plate.

Referring to the drawings by letters, A and A' designate two vertical frames, which are suitably secured together to form a rigid support for the working parts of the machine. A driving-shaft $a$ has bearing in each of said frames, and one end of said shaft carries fast and loose pulleys $a'$ and $a^2$, and the opposite end of said shaft is provided with a pinion $a^3$. A cam-shaft B extends in a direction parallel with said driving-shaft and above the latter, and said shaft is supported in suitable bearings $b$ on top of the frames A and A', and at one end said cam-shaft carries a gear B', which latter has position on the exterior of the frame A and meshes with the pinion $a^3$, and the other end of said shaft carries a cam $B^2$, adjoining the frame A'. Two brackets C project vertically above the frames A and A', and these brackets support a horizontal rock-shaft C'. Another rock-shaft $C^2$ is supported in suitable bearings $c$, attached to the frames, and this latter rock-shaft has position in a vertical plane directly beneath the rock-shaft C' and in a horizontal plane between the shafts $a$ and B. A cross-bar $c'$ extends in a horizonal direction between the frames A and A' at the rear of the machine, and at the front of the machine the said two frames support a horizontal plate D.

The mandrel mechanism and adjoining parts will now be described, reference being had particularly to Fig. 6 of the drawings.

The plate D is supported at each end by the frames A and A', and on its top surface said plate supports a collar $d$. A shaft D' is supported vertically above the plate D, and the lower end of said shaft projects down through the said collar $d$ and into said plate. Suitable pins or screws $d'$ extend through the collar and impinge against the shaft D' and serve to hold the latter from vertical displacement. The collar $d$ is also provided with a plurality of evenly-spaced circumferential depressions $d^2$ for a purpose to be presently described. A head $D^2$ has a plurality of radial arms $D^3$ and a central bore $d^4$, and said head fits down over the upper end of the shaft D' and rests on top of the collar $d$. The radial arms $D^3$ are each provided with horizontally-extending slots $d^5$, which extend from the ends of the arms toward the head D² and divide each arm into an upper and lower member $d^6$ and $d^7$. A circular ring-plate E, having a horizontal flange $e$, is secured to the bottom of the arms D³ by screws $e'$, and this ring-plate hangs pendent from said arms and encircles the head D². The lower member $d^7$ of each arm D³ is provided with a stationary half-cylindric mandrel-section $e^2$. An inverted-L-shaped or angle bar $e^3$ is pivoted at $e^4$ to the lower member $d^7$ of each arm, and one end $e^5$ of said bar extends in a substantially horizontal direction and parallel with the radial arms, while the other end $e^6$ of each angle-bar hangs pendent from said pivot-point $e^4$ and projects downwardly through the ring-plate E and terminates near the top surface of the plate D, and these lower ends are each provided with a roller $e^7$. A plurality of spiral or coiled springs each has one end seated in one of the circumferential depressions $d^2$ in the collar $d$, and the other end of said springs each abuts against the lower end of one of said angle-bars $e^3$ and serves to press said lower ends outward and away from said collar. The upper ends $e^5$ of said angle-bars each carries an upper half-cylindric mandrel-section $f$, each of which latter is pivoted to one of said angle-bars and has a slight independent movement therewith. These upper mandrel-sections have position directly above the lower mandrel-sections, but are separated therefrom, so as to permit a slight vertical movement, and said upper sections are coated with enamel $f^8$. The body is placed on the mandrel with the overlapping edges or the seam which is to be soldered contacting with the enameled section, which in the present instance is the movable section $f$. This enamel coating on the mandrel is advantageous in that the molten solder will not adhere to it and the soldered bodies will not stick and resist ejectment. The space intervening between the two mandrel-sections is also utilized during the operation of extracting or withdrawing the soldered bodies from the mandrel-sections in a manner to be hereinafter described. It will thus be seen that when the lower ends $e^6$ of the angle-bars are pressed inward toward the collar $d$ by the rollers $e^7$ contacting with the stationary curved plate $e^8$ the mandrel-section $f$ will be lowered from the upper member $d^6$ of the radial arms. This operation is provided for the purpose of removing the can-body from the mandrel-sections. Each of the upper members $d^6$ of the radial arms is provided with a horizontally-extending abutment $f'$, against which the overlapping edges of the bodies are pressed by the action of the spring on the angle-bars $e^3$ and held together prior to and during the operation of soldering.

It is to be understood that the head D² and radially-extending arms D³ are to be intermittently revolved in order to present the mandrel successively to given points, first, to receive the bodies; second, to solder the bodies, and, third, to eject the soldered bodies. The mechanism therefore employed to accomplish this step-by-step revolution of the head and radially-extending arms will now be described, reference being had particularly to Figs. 5, 6, 7, and 11.

The ring-plate E is provided with a plurality of depending pins $f^2$, which project downwardly below the flange $e$, and one of these pins is provided for each mandrel and radial arm. For example, if the machine is provided with six mandrels and six radial arms the ring-plate E will be provided with six pins $f^2$. A guide-bracket $f^3$ is secured on top of the frame A', and a rod $f^4$ has one end slidably supported in said bracket, while the other end of said rod extends along above the top surface of said frame A' toward the cam-shaft B and is pivotally connected to the upper end of a lever $f^5$, which latter is pivoted at its lower end $f^6$ to the frame A'. This lever $f^5$ is provided with a roller $f^7$, which rides or contacts against the working face $g$ of a cam $g'$ on the cam-shaft B. The rod $f^4$ is also provided with a plate $g^2$, which is pivoted thereon and moves back and forth therewith, and said plate also has a lateral movement in a horizontal direction with respect to said rod. By reference to Fig. 5 it will be seen that the plate $g^2$ projects inwardly and has position behind the pins $f^2$, (the position of the pins being shown in dotted lines,) and as the rod $f^4$ and plate $g^2$ are moved forward by the cam $g'$ the pins $f^2$ on the bottom of the ring-plate E will be moved forward a distance equal to the stroke of the rod, and the plate E, head D², and shaft D' will all be revolved or moved forward one step. The rod $f^4$ and plate $g^2$ are returned to their normal positions by a spiral spring, which latter has one end attached to the lever $f^5$ and its other end secured to a portion of the frame, as seen in Fig. 11. This forward movement is made rapidly, and it is desirable that some means be provided to insure that the several mandrels will stop at the proper places, so that the several different operations simultaneously under way on the different mandrels may be properly performed. It is also desirable that the shock occasioned by the sudden stopping of the revolving head be relieved, so as to prevent serious damage by repeated shocks. By reference to Figs. 5, 6, 7, and 13 this mechanism will now be briefly described.

On the bottom the ring-plate E is provided with a plurality of lugs $h$, which are cast integral therewith, and said lugs are each provided with a threaded hole through which a set screw or bolt projects. These lugs are arranged on the bottom of the flange $e$ near the rim edge, and in the present instance six of these lugs are provided. Secured to the bottom of the flange $e$ are a plurality of stop-plates $h'$, one adjoining each of the lugs $h$, and each of which is provided at opposite ends with a slot $h^2$, through which a bolt passes into the bottom of the ring-plate. Each of these stop-plates $h'$ is provided with a shoulder $h^2$, and when the ring-plate is revolved by the movement of the rod $f^4$, as heretofore described, these stop-plates are designed to be brought successively over a centering-pin $h^3$, which will engage the shoulders one at a time and center the plate and the mandrels with respect to the various devices that are to coact with the mandrels.

The centering-pin mechanism will now be described. (See Figs. 5, 6, and 13.) A bracket $i$ is secured at the rear of the plate D, and said bracket is provided with a cross-slot $i'$. The centering-pin $h^3$ projects vertically through the slot of said bracket and above the top of the latter, as seen, and a spring-pressed head $i^2$ has position in the slot $i'$ and abuts against the pin $h^3$ and keeps the latter pressed toward the frame A. The lower end of the pin $h^3$ (see Fig. 13) is provided with two collars $i^3$, and a spiral spring $i^4$ surrounds the pin and is secured at one end to one of said collars, while the other end of said spring is secured to the bracket $i$. This spring $i^4$ serves to keep the pin $h^3$ pressed upwardly. A lever $i^5$ is pivotally supported on the rock-shaft $C^2$ at the rear of the machine, and said lever projects forwardly beneath the cam-shaft B and at its extreme outer end is bifurcated or forked, and the two prongs $i^6$ of said forked end project on opposite sides of the pin $h^3$ between the collars $i^3$. A cam $i^7$ on the cam-shaft B has position immediately above the lever $i^5$, and as the cam turns it contacts with the top surface of said lever $i^5$ and causes the latter to be depressed, carrying the pin $h^3$ with it, while the spring $i^4$ serves to raise the pin and lever when the cam moves out of contact with the latter. It is obvious that the cam $i^7$ may be readily adjusted on the shaft B and turned to depress and release the pin $h^3$ from engagement with the stop-plates $h'$.

In order to prevent the plate E and head $D^2$ from turning too easily and running away from the plate $g^2$, I provide a friction-brake device comprising a horizontal flat bar $h^4$, which is supported at one end by a bracket $h^5$, and at the other end said bar is adjusted laterally by a set-screw $h^6$ on a bracket $h^7$. The flat bar $h^4$ contacts with the rim edge of the plate E and serves as a brake.

The solder-iron mechanism will next be described, attention being called to Figs. 1, 2, 3, 4, and 14 of the drawings. In this connection it is to be understood that the body undergoing the soldering operation is always on the mandrel having position directly above the centering-pin. A rock-sleeve J is mounted on the shaft $C'$, and said sleeve in cross-section is substantially square and at its forward end is provided with a downwardly-projecting lug $j$. A rod $j'$ is pivotally connected to the lug $j$ of the sleeve and extends downwardly, and at its lower end said rod is connected to a rock-arm $j^2$. This rock-arm $j^2$ is mounted at one end on the shaft $C^2$, and the other end of said arm is provided with a roller $j^3$, which has position in the path of a cam $j^4$ on the shaft B. It will thus be seen that the revolution of the cam $j^4$ will cause the rock-arm $j^2$ and rod $j'$ to reciprocate vertically, and thereby impart a rocking movement to the sleeve J. A horizontal bar $J'$ passes through the sleeve J and at its forward end is supported in a forked bracket $j^5$, which permits the said bar to be moved horizontally and also vertically, as will presently be described. A soldering-iron $J^2$ of any suitable construction is secured to the bar $J'$ and moves therewith. In the drawings (see particularly Fig. 1) the iron is shown in a position slightly raised above the mandrel-section $f$. The iron is preferably of the ordinary hollow construction, having a burner on the inside, (not shown,) and a tube $j^6$ conveys gas to said burner. A bar $J^3$ is pivotally connected at its forward end to said movable bar $J'$, and the other end of said bar is loosely connected to the upper end of a rock-bar $J^4$, which is supported on and rocks with the shaft $C^2$. By reference to Figs. 2, 3, and 4 it will be clearly seen how the shaft $C^2$ is rocked. A cam $B^2$ is carried on the end of the shaft B and is provided with a cam-groove $b^2$. A cam-lever $J^5$ is carried on the end of the shaft $C^2$, and the forward end of said lever is provided with a roller $b^3$, which fits and travels in said cam-groove $b^2$. It will readily be seen that as the cam $B^2$ turns with the shaft B the forward end of the cam-lever $J^5$ will be caused to move up or down as the roller travels in the said groove, and this movement of the forward end of said lever $J^5$ causes the shaft $C^2$ to be rocked one way or another. As the shaft $C^2$ is rocked according to the shape of the groove in the cam $B^2$, the upper end of the rock-bar $J^4$ is caused to move backward or forward, carrying the bar $J^3$, the longitudinal bar $J'$, and the soldering-iron $J^2$ with it. This reciprocating movement of the soldering-iron is irregular—that is, the cam-groove $b^2$ is shaped so as to at first give the iron a slight reciprocating movement to spread the solder along the seam and then a movement over the seam along the entire length of the body. Attention will be called again to this feature in connection with the solder-feed device, which will now be described.

Referring to Figs. 1, 3, 4, and 15 to 20, it will be seen that the cross-bar $c'$ extends horizontally between the two frames A and A' and just beneath and at the rear of the solder-feed mechanism. Secured to this cross-bar $c'$ and projecting both above and below the same is a bracket $n$, the top end $n'$ of which projects or inclines outwardly over the frame A as only seen in Fig. 4. At the upper end this bracket pivotally supports a box or housing $n^2$, the latter being pivoted at its rear upper corner by a bolt $n^3$, so that the lower end of the housing may be moved or swung away from said bracket. The front wall $n^4$ of the housing is provided with a plurality of openings $n^5$, from each of which a tube $n^6$ projects. The ends of each of these tubes project forward and are then turned inward over the mandrel holding the body undergoing the soldering operation, as clearly seen in Fig. 3. A shaft $o$ extends crosswise of the housing $n^2$ and carries a roller $o'$, whose circumference is roughened or provided with serrations. To the upper edge of the front wall $n^2$ are pivoted a plurality of arms $o^2$. In the present instance there are three of these arms, and each is provided with a depending portion $o^3$ and a roller $o^4$, which latter has position over the serrated circumference of the roller $o'$. A spiral spring $o^5$ is attached to the free end of each of said arms $o^2$ and the other end of each of said springs is attached to a stationary lug on the rear of the bracket $n$. These springs serve to keep the arms and rollers $o^4$ pressed down toward the roller $o'$ for a purpose to be presently described.

Secured to the frame A, beneath the bracket C, is an L-shaped bracket $p$, having one arm extending vertically at the rear of the machine. This vertical arm of said bracket pivotally supports a plurality of reels $p'$, in the present instance three in number, on which the wire-solder $p^2$ is wound. In practice the strands of wire-solder are drawn from the reels $p'$, and said strands are each fed through an opening $p^3$ in the bracket $n$, between the rollers $o'$ and $o^4$, and then through the openings $n^5$ in the front wall of said housing and through the tubes $n^6$ to a point adjacent to the soldering-iron $J^2$. It will thus be understood that each of the three strands of wire-solder are clamped between the rollers $o'$ and $o^4$ by the action of the springs $o^5$. On the exterior of the housing $n^2$ the shaft $o$ carries a bell-crank bracket $q$, which latter is loose on said shaft, and said bracket is provided with two arms $q'$ and $q^2$, which latter project at an angle with respect to each other. A ratchet-wheel $q^3$ is also carried on the outer end of said shaft $o$ and beyond said bracket $q$, and a pawl $q^4$, pivotally mounted on the arm $q'$ of said bracket, engages the ratchet-wheel to cause it to turn in one direction and prevent its turning in the opposite direction. A bracket $r$ is secured at one end to the bracket $n$, and at its other end said bracket $r$ is provided with an elongated slot $r'$, through which a bolt $r^2$ passes and screws into the end of the arm $q^2$ on the bell-crank bracket $q$. The slot $r'$ permits the arm $q^2$ to have a slight movement independent of the bracket.

It has heretofore been explained that the housing $n^2$ is pivotally connected to the upper end $n'$ of the bracket $n$ by the bolt $n^3$. The object in thus pivoting said housing and giving the latter a swinging movement away from the bracket $n$ is to accomplish the feeding of solder through the tubes $n^6$ to the soldering-iron $J^2$. This is accomplished as follows: The front wall $n^4$ of the housing is provided at the side adjoining the bell-crank bracket $q$ with a downwardly-projecting lug or arm $s$, to which latter the upper end of a rod $s'$ is pivoted. The lower end of said rod $s'$ is pivoted to a cam-lever $s^2$, which latter is pivoted between its ends to the bracket $n$ below the cross-bar $c'$, as clearly shown in Figs. 1, 15, 16, and 17. The lower end of the lever $s^2$ is provided with a roller $s^3$, which engages or contacts with the working face of a cam $s^4$ on the cam-shaft B. This cam $s^4$ is provided at one side with a depression $s^5$, into which the roller $s^3$ on the end of the cam-lever $s^2$ drops to permit the lower end of said cam-lever to move outward toward the frame A. This movement of the cam-lever will cause the rod $s'$ to move downward in an inclined direction (as the latter is pivoted to the inclined end of the arm $n$, as plainly seen in Figs. 1 and 3) and causes the tubes $n^6$ to move toward the mandrel and at the side of the soldering-iron for the soldering operation. The movement of the housing is aided by the tension of the spring $s^6$, against the action of which the cam $s^4$ works. When the housing $n^2$ is partly elevated, as shown in the drawings, the tubes $n^6$ are away from the mandrel and soldering-iron and solder has been fed and is projecting from the end of the tubes ready to be applied. It is therefore to be understood that the movement of the housing to swing the tubes away from the iron and the mandrel causes the feeding of solder. It will be understood that the arm $q^2$ is allowed to move only the length of the slot in the end of the bracket $r$, while the housing $n^2$ has a greater movement, and when said arm has reached the end of the slot the bracket $q$, on which the arms $q'$ and $q^2$ are carried, will merely turn on the shaft $o$ and cause the pawl $q^4$ to engage the ratchet-wheel $q^3$ and give the shaft a slight turn in the direction indicated by the dart. The slight turning of the shaft is imparted to the roller $o'$ within the housing, which engages the several strands of wire-solder and draws the wire-solder $p^2$ from the reels $p'$ and feeds it through the tubes $n^6$.

The mechanism for ejecting the bodies from the mandrels will now be described, attention being called particularly to Figs. 3, 5, and 12.

The plate D is provided with a horizontally-extending guideway $k$, which extends in a direction parallel with the two frames A and A', and a bar $k'$ extends through said guideway and has a horizontal movement there-through. The inner end of this bar $k'$ is provided with a roller which has position in front of the working face of a cam $k^2$ on the cam-shaft B. The outer end of the bar $k'$ is turned inwardly and extends toward the frame A and then vertically, and at its upper end said bar supports a U-shaped head $k^3$. This U-shaped head is provided with inwardly-projecting arms $k^4$, which are spaced far enough apart to take over the ends of the mandrels and on diametrically opposite sides of a can-body, (see Fig. 3,) and each arm of the U-shaped head is provided with a hook $k^5$, the point ends of which project inwardly toward each other and the other end of which hook is connected to a spiral spring.

It has heretofore been stated that a space intervenes between the upper and lower mandrel-sections $f$ and $e^2$, respectively, and that such space is provided and is utilized in extracting or withdrawing the soldered bodies from the two mandrel-sections. The hooks $k^5$ just above described project into the space between the two mandrel-sections $f$ and $e^2$ at the inner ends of the can-body, and as the cam $k^2$ pushes the rod $k'$ and the U-shaped head $k^3$ outwardly (the several figures in the drawings showing the rod moved part of the way out) the hooks $k^5$ engage the end of the body and draw it from the mandrel. A coiled spring is secured at one end to the rod $k'$, and the other end of said spring is attached to the plate D, so that the end of the rod $k'$ will be kept in contact with the cam $k^2$. It will thus be seen that the spring serves to return the U-shaped head $k^3$ to engage another body.

As the sheet-metal blanks are inserted on the mandrels the two confronting longitudinal edges are fluxed, so that when in position on the mandrel with one of said edges overlapping the other both of said edges are prepared to receive the solder. The fluxing device will therefore now be described, attention being called to Figs. 1, 3, 9, and 10. This fluxing device comprises a tray $l$, having a central vertical arm $l'$, by means of which it is secured to a bracket $l^2$, suitably supported by the frame A of the machine. Arms $l^3$ are pivoted, one at each side, to the vertical arm $l'$, and each of said pivoted arms $l^3$ is provided with a pad $l^4$. The bottom of the tray $l$ is also provided with a pad $l^5$, on the top of which the pads $l^4$ on said pivoted arms rest when in the normal position. A tube $m$ extends vertically above the tray and at its upper end carries a cup $m'$ for the storage of the fluxing solution. This flux solution, by means of an adjusting device connected to the cup $m'$ and not illustrated, permits the solution to drip onto the pads $l^5$ in the tray and sufficiently soak them, so that the solution will be transferred to the pads $l^4$ on the pivoted arms when the latter contact with the pads $l^5$. The operator takes the blank and turns the two longitudinal edges toward each other. The two confronting edges are then placed on top of the tray, so that one edge will take on one side of the vertical arm $l'$ and the other edge on the opposite side of said arm. Both of the edges of the body will then have position beneath the pads $l^4$, and as the body is moved forward the pivoted arms $l^3$ will raise and permit the body to pass, and the pads $l^4$ will wipe along said two edges and dampen them with flux.

The fluxing device is so arranged with respect to the mandrel on which the body is to be placed that the movement of the body beneath the pads $l^4$ will direct the same onto the mandrel.

A detailed statement of the operation of the machine is deemed unnecessary, as the operation of the various parts have each heretofore been described.

The edges of the blank bodies are first passed through the fluxing device, so that said edges which are to be overlapped are first fluxed. The fluxed bodies are then wrapped around the mandrel-sections, with the overlapping edges resting on the enameled mandrel-section $f$, when they are clamped beneath the abutment $f'$. The head $D^2$ and radial arms $D^3$ are then revolved one step by the forward movement of the rod $f^4$ and plate $g^2$, as heretofore described, and another mandrel is presented in front of the fluxing device to receive a body and the radial arms moved around another step. This last partial revolution of the radial arms and mandrels brings the first body into position to be operated on by the soldering-iron. The soldering-tubes $n^6$ are now moved toward the mandrel on which the soldering operation is to take place and in readiness for the iron to do its work, as heretofore described. The radial arms are then given another turn and another body placed on a mandrel, and at the same time another body is soldered and the first one put on is cooling. This cooling operation is permitted to last during three partial revolutions of the arms, and the bodies are then engaged by the hooks $k^5$ on the ejector device and withdrawn from the mandrel. The mandrel from which the body is ejected at the next revolution of the arms is again presented in front of the fluxing device to receive another body.

The upper mandrel-sections $f$ have herein been described as being coated with enamel $f^8$, made of vitreous material and of a glassy nature. This enamel coating affords an important advantage, as the molten solder employed will not stick to it, and the can-bodies are therefore readily ejected after having been soldered.

Having thus fully described my invention, what I claim as new, and desire to secure by Letters Patent, is—

1. In a can-machine the combination with a head carrying a plurality of rigid radial clamping-arms, of mandrel-sections rigidly sustained by said head but moving with the latter; mandrel-sections movable between the rigid arms and the rigid mandrel-sections, and means for pressing the movable sections against said rigid clamping-arms.

2. In a can-machine the combination with a head having a plurality of radial arms; a plurality of stationary mandrel-sections supported by said head; a plurality of bell-crank levers pivoted to said head and movable in a longitudinal plane therewith; one end of each of said levers carrying a movable mandrel-section and the other end of each of said levers projecting downwardly; means coacting with the downwardly-projecting ends of said levers to draw the movable mandrel-sections toward the stationary sections while a body is being placed thereon, and means for keeping the mandrels separated after a body has been placed thereon.

3. In a can-machine the combination with the frame; a horizontal plate supported by said frame; a shaft supported vertically by said plate; a head on said shaft; a plurality of mandrels carried by said head; a ring-plate also carried by said head; a rod supported by said frame; means for horizontally reciprocating said rod, and means coacting between said rod and ring-plate whereby the latter is revolved as the rod is reciprocated.

4. In a can-machine the combination with the frame; a head supported so as to be revolved above said frame; a plurality of mandrels carried by said head; a ring-plate also carried by said head and having a plurality of downwardly-projecting pins; a rod supported by said frame; a plate pivoted to said rod and adapted to engage said downwardly-projecting pin and means for horizontally moving said rod and pivoted plate so that the latter will engage the pins on said ring-plate and revolve the same.

5. In a can-machine the combination with the frame; a head supported so as to revolve above said frame; a plurality of mandrels carried by and revolving with said head; means for intermittently revolving said head and mandrels; a horizontally-reciprocating bar; a U-shaped ejector device carried by said bar and adapted to take successively on opposite sides of each of said mandrels, said ejector device having a plurality of pivoted hooks for engagement with the can-body, and means for reciprocating said bar and U-shaped ejector.

6. In a can-machine the combination with a frame; a head supported above said frame; a plurality of mandrels carried by said head; means for revolving said head and mandrels intermittently; a bar above said mandrels; a soldering-iron carried by said bar; means for reciprocating said bar and soldering-iron, and means for moving the soldering-iron vertically so as to permit the head and mandrels to be revolved horizontally.

7. In a can-machine the combination with a frame; a head supported above said frame; a plurality of mandrels carried by said head; a shaft supported horizontally above said frame; a rock-sleeve carried by said shaft; a bar supported by said sleeve; means for reciprocating said bar through said rock-sleeve; a soldering-iron carried by and reciprocating with said bar; and means for rocking said sleeve so as to raise and lower said bar and iron.

8. In a can-machine the combination with a frame; a head supported above said frame; a plurality of mandrels carried by said head; a shaft supported horizontally above said frame; a rock-sleeve carried by said shaft; a horizontal bar extending through and supported by said sleeve; a rock-shaft; a rock-bar mounted on said rock-shaft and extending upwardly; a bar connecting the upper end of said rock-bar with said horizontal bar whereby to reciprocate the latter through said sleeve; a soldering-iron carried by and moving with said horizontal bar; and means for vertically moving said horizontal bar and iron.

9. In a can-machine the combination with a frame; a head supported above said frame; a plurality of mandrels carried by said head; a shaft supported horizontally above said frame; a rock-sleeve mounted on said shaft; a rod connected at its upper end to said sleeve; a cam and lever coacting with the lower end of said rod whereby to raise and lower the latter and vertically rock said sleeve; a horizontal bar extending through and rocking with said sleeve; a soldering-iron carried by said bar, and means for reciprocating said bar through said sleeve.

10. In a can-soldering machine the combination with a head of a plurality of mandrels movable with said head; a reciprocating soldering-iron coacting with each mandrel successively as the head is revolved; a pivoted solder-feed device; means for moving the solder-feed device toward the iron and mandrel and then away from the iron and mandrel to permit the head and mandrel to be revolved.

11. In a can-machine the combination with a frame; a plurality of mandrels movable with respect to said frame; a soldering-iron; a box or housing pivoted with respect to said frame and having one or more solder-feed tubes for directing the solder to a point between the soldering-iron and mandrel; means for moving said box or housing on its pivot whereby to draw the tubes away from the mandrel and soldering-iron, and means whereby upon the withdrawal of said tube the solder will be fed.

12. In a can-machine the combination with a head, of a plurality of mandrels sustained by said head; means for imparting a step-by-step motion to said head and mandrels; a soldering-iron; means for giving the iron a plurality of forward and backward movements above the mandrel while the latter is at rest; a solder-conveying tube, and means for withdrawing the tube to permit the mandrels to pass and then return the tube toward the side of the iron.

In testimony whereof I affix my signature in the presence of two witnesses.

CHARLES H. AYARS.

Witnesses:
J. G. RICHMOND,
W. P. BULLINGER.